US011611877B2

(12) United States Patent
Chauhan

(10) Patent No.: US 11,611,877 B2
(45) Date of Patent: Mar. 21, 2023

(54) USER AUTHENTICATION

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 373 days.

(21) Appl. No.: 16/924,114

(22) Filed: Jul. 8, 2020

(65) Prior Publication Data

US 2022/0014915 A1    Jan. 13, 2022

(51) Int. Cl.
| | |
|---|---|
| *H04W 12/06* | (2021.01) |
| *H04L 9/40* | (2022.01) |
| *H04W 4/60* | (2018.01) |
| *H04W 12/63* | (2021.01) |
| *H04L 65/61* | (2022.01) |

(52) U.S. Cl.
CPC ......... *H04W 12/068* (2021.01); *H04L 63/083* (2013.01); *H04L 65/61* (2022.05); *H04W 4/60* (2018.02); *H04W 12/63* (2021.01)

(58) Field of Classification Search
CPC ...... H04W 12/068; H04W 12/47; G06F 21/35
See application file for complete search history.

(56) References Cited

U.S. PATENT DOCUMENTS

| | | |
|---|---|---|
| 8,332,500 B1 | 12/2012 | Singleton et al. |
| 8,850,421 B2 | 9/2014 | Proud |
| 9,167,404 B1 | 10/2015 | Freed et al. |
| 9,215,592 B2 * | 12/2015 | Narendra .............. H04L 63/083 |
| 9,264,426 B2 | 2/2016 | Buer et al. |
| 9,305,298 B2 * | 4/2016 | Wilson .................. H04L 9/0822 |
| 9,425,627 B2 | 8/2016 | Proud |
| 9,510,357 B1 | 11/2016 | Egner et al. |
| 9,723,367 B1 | 8/2017 | Long et al. |
| 9,940,807 B1 | 4/2018 | Brasch et al. |
| 10,063,564 B2 | 8/2018 | Seigel et al. |

(Continued)

OTHER PUBLICATIONS

U.S. Appl. No. 16/036,862, Office Action dated Jan. 7, 2021, 70 pages.

(Continued)

*Primary Examiner* — Ponnoreay Pich
(74) *Attorney, Agent, or Firm* — Han Santos, PLLC

(57) ABSTRACT

Methods, systems, and apparatus, including computer programs encoded on a computer storage medium, for user authentication are disclosed. In one aspect, a method includes the actions of receiving a request to access a streaming service on an electronic device. The actions further include, in response to receiving the request to access the streaming service on the electronic device, determining, by the computing device, that a subscriber device is in a vicinity of the electronic device. The actions further include, based on determining that the subscriber device is in the vicinity of the electronic device, determining, by the computing device, a user identifier associated with the subscriber device. The actions further include determining that the user identifier is associated with a valid subscription to the streaming service. The actions further include providing data to access the streaming service.

20 Claims, 5 Drawing Sheets

(56) References Cited

U.S. PATENT DOCUMENTS

| | | | |
|---|---|---|---|
| 10,291,465 B2 | 5/2019 | Rjeili et al. | |
| 10,346,905 B1 | 7/2019 | Chang et al. | |
| 10,587,623 B2 | 3/2020 | Chauhan | |
| 10,742,630 B2* | 8/2020 | Caterino | G07C 9/27 |
| 11,113,269 B1 | 9/2021 | Garcia et al. | |
| 2006/0223495 A1 | 10/2006 | Cassett et al. | |
| 2006/0277564 A1 | 12/2006 | Jarman | |
| 2008/0065746 A1 | 3/2008 | Moghaddam et al. | |
| 2009/0253431 A1 | 10/2009 | Shi et al. | |
| 2010/0019920 A1* | 1/2010 | Ketari | G08B 21/0213 340/686.6 |
| 2010/0030695 A1* | 2/2010 | Chen | H04W 12/30 705/17 |
| 2010/0268645 A1 | 10/2010 | Martino et al. | |
| 2010/0312706 A1 | 12/2010 | Combet et al. | |
| 2011/0040871 A1 | 2/2011 | Neal | |
| 2011/0293095 A1* | 12/2011 | Ben Ayed | H04W 12/50 455/26.1 |
| 2012/0071132 A1 | 3/2012 | Carlander | |
| 2012/0084349 A1 | 4/2012 | Lee et al. | |
| 2012/0117221 A1 | 5/2012 | Katpelly et al. | |
| 2012/0238287 A1 | 9/2012 | Scherzer | |
| 2012/0258437 A1 | 10/2012 | Sadeh-Koniecpol et al. | |
| 2012/0278867 A1 | 11/2012 | Cox et al. | |
| 2012/0310804 A1 | 12/2012 | Raleigh et al. | |
| 2012/0311038 A1* | 12/2012 | Trinh | G06F 21/33 709/204 |
| 2013/0010962 A1 | 1/2013 | Buer et al. | |
| 2013/0040629 A1 | 2/2013 | Sprigg et al. | |
| 2013/0189953 A1* | 7/2013 | Mathews | G01S 5/02521 455/411 |
| 2013/0223308 A1 | 8/2013 | Chandra et al. | |
| 2013/0262233 A1 | 10/2013 | Bradley et al. | |
| 2013/0268767 A1* | 10/2013 | Schrecker | G06F 21/31 713/185 |
| 2013/0303110 A1 | 11/2013 | Gauthier | |
| 2013/0340034 A1 | 12/2013 | Rich et al. | |
| 2014/0006483 A1 | 1/2014 | Garmark et al. | |
| 2014/0006947 A1 | 1/2014 | Garmark et al. | |
| 2014/0007154 A1 | 1/2014 | Seibold et al. | |
| 2014/0047512 A1 | 2/2014 | Sidi | |
| 2014/0137199 A1* | 5/2014 | Hefetz | H04W 4/029 726/3 |
| 2014/0189808 A1 | 7/2014 | Mahaffey et al. | |
| 2014/0207950 A1 | 7/2014 | Badiee et al. | |
| 2014/0215081 A1 | 7/2014 | Cili et al. | |
| 2014/0250430 A1 | 9/2014 | Proud | |
| 2014/0281565 A1* | 9/2014 | Narendra | H04W 12/06 713/185 |
| 2014/0289824 A1 | 9/2014 | Chan et al. | |
| 2014/0344927 A1 | 11/2014 | Turgeman et al. | |
| 2015/0082396 A1 | 3/2015 | Theebaprakasam et al. | |
| 2015/0089599 A1 | 3/2015 | Vignisson et al. | |
| 2015/0092673 A1 | 4/2015 | Singh et al. | |
| 2015/0131488 A1 | 5/2015 | Martinez et al. | |
| 2015/0163121 A1 | 6/2015 | Mahaffey et al. | |
| 2015/0199660 A1 | 7/2015 | Dolan et al. | |
| 2015/0326550 A1 | 11/2015 | Schropfer et al. | |
| 2015/0339474 A1* | 11/2015 | Paz | G06F 21/35 713/185 |
| 2016/0103996 A1 | 4/2016 | Salajegheh et al. | |
| 2016/0191588 A1 | 6/2016 | Shafer | |
| 2016/0248766 A1 | 8/2016 | Tembey et al. | |
| 2016/0267524 A1 | 9/2016 | Ng | |
| 2016/0294920 A1 | 10/2016 | Besprosvan | |
| 2016/0301779 A1 | 10/2016 | Cui et al. | |
| 2016/0342992 A1 | 11/2016 | Lee | |
| 2016/0373548 A1 | 12/2016 | Fails | |
| 2017/0083821 A1 | 3/2017 | Foerster et al. | |
| 2017/0180394 A1 | 6/2017 | Crofton et al. | |
| 2017/0262606 A1 | 9/2017 | Abdullah et al. | |
| 2017/0264628 A1 | 9/2017 | Treat et al. | |
| 2017/0353463 A1 | 12/2017 | Wu et al. | |
| 2018/0048640 A1* | 2/2018 | Johansson | H04L 63/102 |
| 2018/0063670 A1 | 3/2018 | Garg et al. | |
| 2018/0098216 A1 | 4/2018 | Vincent et al. | |
| 2018/0288060 A1 | 10/2018 | Jackson et al. | |
| 2018/0352301 A1 | 12/2018 | Tofighbakhsh | |
| 2018/0373887 A1 | 12/2018 | Smith | |
| 2019/0124056 A1 | 4/2019 | Monibi et al. | |
| 2019/0180635 A1 | 6/2019 | Jennings et al. | |
| 2019/0199780 A1* | 6/2019 | Cook | H04L 67/564 |
| 2019/0236470 A1 | 8/2019 | Chauhan | |
| 2019/0238548 A1 | 8/2019 | Chauhan | |
| 2019/0238549 A1 | 8/2019 | Chauhan et al. | |
| 2019/0238644 A1 | 8/2019 | Chauhan et al. | |
| 2019/0312884 A1* | 10/2019 | Vinukonda | H04L 65/612 |
| 2020/0020220 A1 | 1/2020 | Stefanski et al. | |
| 2021/0092605 A1* | 3/2021 | Draznin | H04L 63/0281 |
| 2021/0297496 A1* | 9/2021 | Harb | H04N 21/6581 |
| 2021/0385204 A1* | 12/2021 | Chauhan | H04L 63/083 |
| 2021/0385655 A1* | 12/2021 | Chauhan | H04W 12/02 |
| 2022/0014915 A1* | 1/2022 | Chauhan | H04L 65/61 |

OTHER PUBLICATIONS

U.S. Appl. No. 16/036,867, Office Action dated Jan. 26, 2021, 23 pages.

GlobeNewsWire, "WebSafety, Inc., iOS and Android App Now Available for Free to Help More Parents Protect Their Children Online", Jun. 16, 2015, GlobeNewsWire (Year: 2015).

U.S. Appl. No. 16/036,862, Notice of Allowance dated Jul. 8, 2021, 89 pages.

U.S. Appl. No. 16/036,867, Final Office Action dated Jun. 25, 2021, 31 pages.

U.S. Appl. No. 16/036,875, Final Office Action dated Jul. 21, 2021, 41 pages.

KidLogger, accessed via http://web.archive.org/web/20170402175208/ http://kidlogger.net:80/demo.html, accessed via Web Archive on Apr. 2, 2017 (Year: 2017).

U.S. Appl. No. 16/036,862, Final Office Action dated May 24, 2022, 612 pages.

U.S. Appl. No. 16/036,862, Office Action dated Feb. 17, 2022, 331 pages.

U.S. Appl. No. 16/036,867, Notice of Allowance dated Oct. 28, 2021, 27 pages.

U.S. Appl. No. 16/036,875, Final Office Action dated Jan. 20, 2022, 58 pages.

U.S. Appl. No. 16/036,875, Office Action dated Oct. 21, 2021, 43 pages.

U.S. Appl. No. 16/036,855, Final Office Action dated Feb. 17, 2022, 45 pages.

U.S. Appl. No. 16/036,855, Office Action dated Jun. 9, 2022, 24 pages.

U.S. Appl. No. 16/036,867, Final Office Action dated Oct. 19, 2020, 28 pages.

U.S. Appl. No. 16/036,855, Non-Final Office Action dated Aug. 20, 2020, 37 pages.

Anjali et al., "A new approach to ranking algorithm—Custom Personalized Searching", 2015, 2nd International Conference on Computing for Sustainable Global Development (INDIACom), vol. 2 (2015), pp. 130-133 (Year: 2015).

U.S. Appl. No. 16/036,875, Office Action dated Jul. 28, 2022, 53 pages.

U.S. Appl. No. 16/036,862, Notice of Allowance dated Sep. 9, 2021, 86 pages.

U.S. Appl. No. 16/036,855, Office Action dated Sep. 15, 2021, 46 pages.

U.S. Appl. No. 16/036,875, Non-Final Office Action dated Mar. 12, 2021, 58 pages.

U.S. Appl. No. 16/036,855, Final Office Action dated May 3, 2021, 42 pages.

U.S. Appl. No. 16/036,839, Non Final Office Action dated Aug. 22, 2019, 13 pages.

U.S. Appl. No. 16/036,839, Notice of Allowance dated Oct. 29, 2019, 17 pages.

U.S. Appl. No. 16/036,862, Final Office Action dated Jun. 25, 2020, 64 pages.

(56) References Cited

OTHER PUBLICATIONS

U.S. Appl. No. 16/036,862, Non Final Office Action dated Dec. 26, 2019, 42 pages.
U.S. Appl. No. 16/036,867, Non Final Office Action dated May 21, 2020, 27 pages.
U.S. Appl. No. 16/036,875, Final Office Action dated Nov. 21, 2022, 60 pages.

* cited by examiner

USER AUTHENTICATION

BACKGROUND

User authentication allows a computing device to verify the identity of an individual accessing the computing device. In some instances, the individual provides the computing device a username and password as part of the authentication process.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Logging in to a content provider application on a streaming device can be a cumbersome process. One approach is for the user to type in a username and password directly into the content provider application through a virtual keyboard displayed on the television. Not only is this tedious for the user, but using the virtual keyboard increases the chance of a typing error. Another approach is for the content provider application to present a code and instructions for the user to enter the code into another device. In this case, the user accesses a browser on one of the user's other devices, navigates to the address indicates on the instructions, and types in the code. If the user is logged in to the content provider on the other device, then the content provider application authenticates to the user. If the user is not logged in to the content provider on the other device, then the user must log in to the content provider using a username and password before the content provider application authenticates the user.

To avoid the user having to perform these extra steps and to avoid extra computing resources being used in attempting to authenticate mistyped codes and passwords, it would be beneficial for the content provider to automatically authenticate the user if a device that the user has previously accessed the content provider is nearby. To achieve this benefit, a server for a wireless network service provider determines when a user attempts to access a streaming service on a streaming device. The server determines whether there are any subscriber devices that are connected to the same network, such as a home Wi-Fi network, as the streaming device. The server determines a user identifier associated with the subscriber device that is on the same network. If the user identifier is linked to a valid subscription for the streaming service, then the server automatically sends the user's credentials to the streaming service. The user can begin to watch the streaming service on the streaming device without having to enter any codes or passwords.

Figure 1:
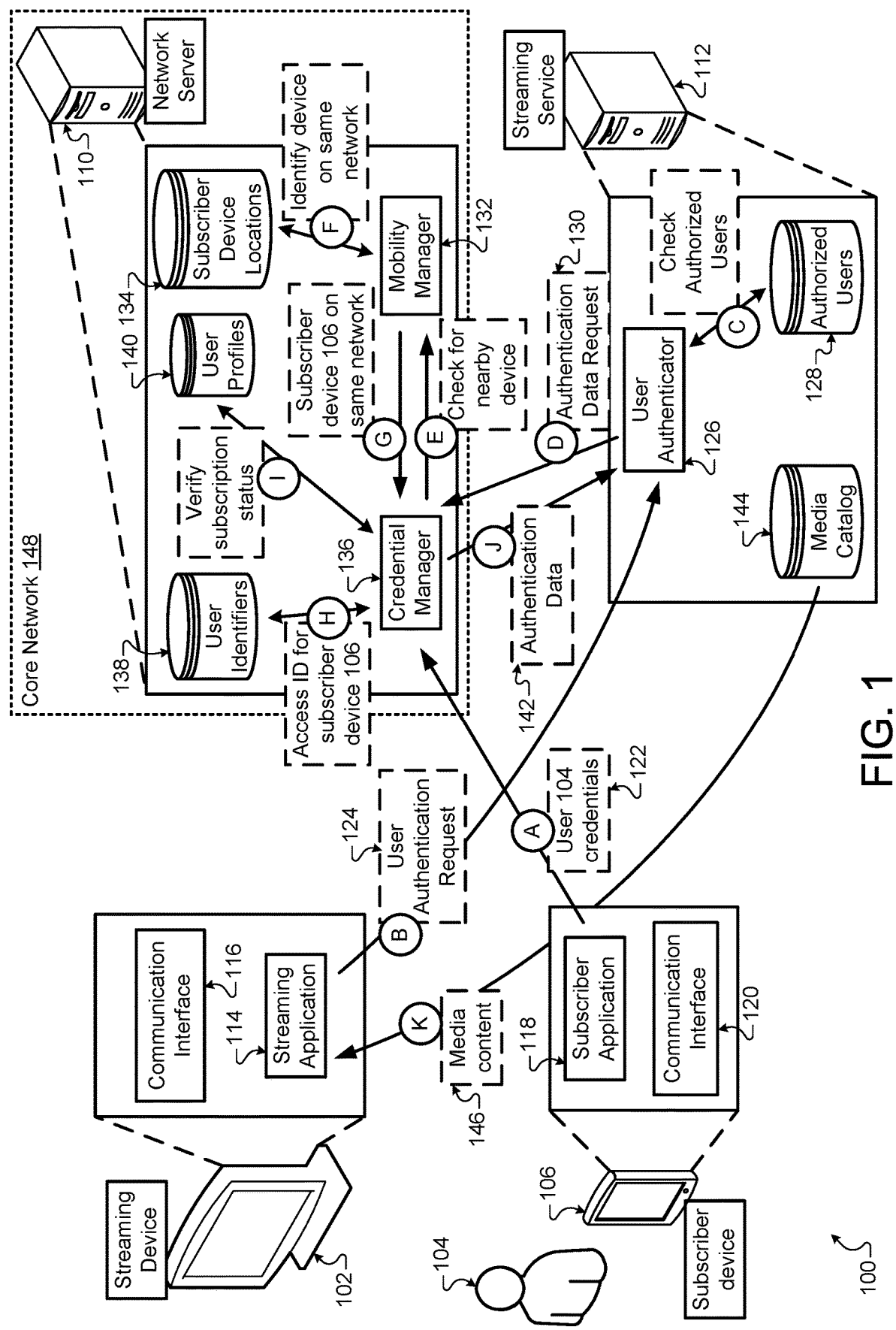
FIG. 1 illustrates an example system for automatically authenticating a user on a streaming service when the subscriber device of the user is in the vicinity of the streaming device.

FIG. 1 illustrates an example system 100 for automatically authenticating a user 104 on a streaming service 112 when a subscriber device 106 of the user 104 is in the vicinity of the streaming device 102. Briefly, and as described in more detail below, the user 104 is attempting to access the streaming service 112 on the streaming device 102. Instead of the user 104 providing a username and password or another type of unique code to the streaming device 102, the network server 108 automatically detects the presence of the subscriber device 106 of the user 104 in the vicinity of the streaming device 102. In response to this detection, the network server 108 provides the necessary data to the streaming service 112 to authenticate the user 104. The user 104 is able to begin streaming videos or other media content from the streaming service 112 on the streaming device 102.

In more detail and in stage A, the subscriber device 106 includes a subscriber application 118. The subscriber application 118 may be software or executable instructions embodied in computer-readable media included in or accessible by the subscriber device 106. The subscriber device 106 may be a feature phone, a smartphone, a tablet computer, a phablet, an embedded computer system, a UAV, a robot, a multimedia recording system, or any other device that is capable of accessing wireless communication services that are provided by multiple types of communication networks. The user 104 can log in to the subscriber application 118 using the credentials 122 of the user 104. The network server 110 includes a credential manager 136 that receives and authenticates the credentials of the user 104. The subscriber application 118 allows the user 104 to manage the account of the user 104 with the wireless network service provider. The user 104 can view billing statements, make payments, determine an amount of data consumed, determine an amount of data remaining, manage other subscriber devices on the same account, and any other account management actions. In some instances, the user 104 may stay logged in to the subscriber application 118 for an extended period of time, for example, weeks or months, after providing the credentials 122 of the user 104. This way the user 104 does not have to log in to the subscriber application 118 each time to manage the account of the user 104.

In stage B, the user 104 attempts to access the streaming service 112 on the streaming device 102. The streaming device 102 may be a smart television, an electronic device (such as, and without limitation, a set-top box, a digital media player, a streaming box, or any other type of device designed for the storage, playback, and/or viewing of digital media content) that is connected to a television or to a display, or another similar device that is capable of streaming media content. The streaming device 102 may include a streaming application 114 that is configured to interface with the streaming service 112. The streaming application 114 may be software or executable instructions embodied in computer-readable media included in or accessible by the streaming device 102. In some implementations, the streaming application 114 may be configured to transmit a user authentication request 124 each time the streaming application 114 is launched. In some implementations, the streaming application 114 may be configured to transmit a user authentication request 124 each time the streaming device 102 is powered on. In some implementations, the streaming application 114 may be configured to transmit a user authentication request 124 after a period of time has elapsed since the streaming application 114 most recently authenticated a user and/or received media content 146 from the streaming service 112. For example, the streaming application 114 may be configured to request that the credentials of the user be reverified every hour.

In some implementations, the user authentication request 124 may include some type of user and/or location identifier. The user authentication request 124 may include data identifying the users whom the streaming device 102 have previously authenticated. For example, the user authentication request 124 may include a user identifier for the user 104 and/or other user identifiers for the other users in the household of the user 104. The user authentication request 124 may include data identifying a physical and/or logical location of the streaming device 102. For example, the user authentication request 124 may include an IP address of the streaming device 102. As another example, the user authentication request 124 may include GPS data in instances where the streaming device 102 includes a GPS receiver. In some implementations, the streaming device 102 may include an RFID reader device. The RFID reader device may detect the presence of an RFID tag. The user authentication request 124 may include data identifying the RFID tag, which may provide more information as to the location of the streaming device 102. In some implementations, the streaming device 102 may include a short-range radio. The short-range radio may detect the presence of a nearby device. The user authentication request 124 may include data identifying the nearby device, which may provide more information as to the location of the streaming device 102.

The streaming service 112 includes a user authenticator 126 that receives the user authentication request 126. The user authenticator 126 may be software or executable instructions embodied in computer-readable media included in or accessible by the streaming service 112. The user authenticator 126 may be configured to manage the authentication process for the user 104 and other users who attempt to access the streaming service 112. In stage C, the user authenticator 126 accesses the authorized users storage 128. The authorized users storage 128 may include data identifying users who have valid subscriptions and/or have accessed the media catalog 144 of the streaming service 112. Additionally, or alternatively, the authorized users storage 128 may include a list of physical and/or logical locations that are associated with valid subscriptions to the streaming service 112. For example, the authorized users storage 128 may include user identifiers and/or IP addresses for those users and locations that have valid subscriptions and/or have accessed the media catalog 144 of the streaming service 112. In some implementations, the streaming service 112 may reverify the data stored in the authorized users storage 128 to ensure that the data is up to date. The streaming service 112 may reverify the data by accessing billing data to ensure that users who have a billing account that is current are identified in the authorized users storage 128 and those users who may have not paid the subscription fee in the past month are removed from the authorized users storage 128. The reverification process may occur at periodic intervals such as every month or every week. Additionally, or alternatively, the reverification process may occur when a new user subscribes to the streaming service 112.

In the event that the user authenticator 126 checks the authorized users storage 128 and determines the authorized users storage 128 does not include any data to grant the user authentication request, in stage D, the user authenticator 126 provides an authentication data request 130 to the network server 110. The authentication data request 130 may include a request for data to determine whether an authorized user is attempting to access the streaming service 112. An authorized user may be someone who has a valid subscription to the streaming service 112. In some implementations, the authentication data request 130 may include data identifying the logical and/or physical location of the streaming device. For example, the authentication data request 130 may include an IP address of the streaming device 102. In some implementations, the user authentication 126 may provide the authentication data request 130 to the network server 110 and bypass checking the authorized users storage 128.

The network server 110 may be included in a wireless carrier network that provides voice and data communication services to multiple subscriber devices, such as the subscriber device 106. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), $5^{th}$ Generation (5G) wireless systems, CDMA-2000 (Code Division Multiple Access 2000), and/or other similar standards.

The wireless carrier network may include a radio access network and a core network 148. The network server 110 may be included in the core network 148. The radio access network may include multiple base stations. The multiple base stations are responsible for handling voice and data traffic between multiple subscriber devices, such as the subscriber device 104, and the core network 148. Accordingly, each of the base stations may provide a corresponding network cell that delivers telecommunication and data communication coverage. The core network 148 may use the network cells to provide communication services to the multiple subscriber devices. For example, the core network 148 may connect the multiple subscriber devices to other telecommunication and data communication networks, such as the Internet and the public switched telephone network (PSTN). The base stations are responsible for handling voice and data traffic between user devices and the core network 148. In some implementations, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from subscriber devices.

The credential manager 136 of the network server 110 receives the token request 130. In stage E, the credential manager 136 provides a request to the mobility manager 132 of the network server 110 to determine whether there are any devices near the streaming device 102. The credential manager 136 may be software or executable instructions embodied in computer-readable media included in or accessible by the network server 110. The credential manager 136 may provide the mobility manager 132 data indicating a logical and/or physical location of the streaming device 102 and a request to determine if there are any devices that are near that logical and/or physical location. For example, the credential manager 136 may provide a request to the mobility manager 132 to determine whether there are any subscriber devices or other devices that are connected to the same home network with the IP address included in the request. In this case, if a subscriber device or another device is on the same home network as the streaming device 102, then the mobility manager 132 may determine that the subscriber device or other device is near, or in the vicinity of, the streaming device 102. As another example, the credential manager 136 may provide a request to the mobility manager 132 to determine whether there are any subscriber devices or other devices that are within a threshold distance (e.g., fifteen meters) of the GPS location of the streaming device 102. In this case, if a GPS location of a subscriber device is within the threshold distance of the GPS location of the streaming device 102, then the subscriber device is near the streaming device 102.

The mobility manager 132 may monitor the locations of the subscriber devices connected to the core network 148 through the radio access network. The mobility manager 132 may be software or executable instructions embodied in computer-readable media included in or accessible by the network server 110. The mobility manager 132 may store the locations of the subscriber devices in the subscriber device locations storage 134. The mobility manager 132 may monitor a base station of the radio access network that each subscriber device is currently connected to and store the location of that base station in the subscriber device locations storage 134. In some implementations, the mobility manager 132 may monitor the IP address for the network that each subscriber device connected to and store the IP address in the subscriber device locations storage 134. This may be the case when a subscriber device is connected to a home Wi-Fi network that is connected to internet service provider. In some implementations, the mobility manager 132 may monitor the GPS locations of each subscriber device. The mobility manager 132 may store the GPS location of each subscriber device in the subscriber device locations storage 134.

In stage F, the mobility manager 132 accesses the subscriber device locations storage 134 to determine if there is a subscriber device in the vicinity of the streaming device 102. The mobility manager 132 may compare the location information of the streaming device 102 as provided by the credential manager 136 to the locations of various subscriber devices stored in the subscriber device locations storage 134. The mobility manager 132 may receive the IP address of the streaming device 102 from the credential manager 136. The mobility manager 132 compares the IP address of the streaming device to the IP addresses of the subscriber devices in the subscriber device locations 134. The mobility manger 132 determines that the IP address of the subscriber device 104 and the streaming device 102 are on the same home Wi-Fi network. In the case where the mobility manger 132 is unable to determine that there is a match between the IP address of the streaming device 102 and the subscriber devices 134 identified in the subscriber device locations 134, the network server 110 may provide data to the streaming service 112 indicating that the user 104 may have to provide credentials directly to the streaming device 102. In some instances, the mobility manger 132 may be able to determine whether the streaming device 102 and the subscriber device 106 are in the same vicinity using alternate techniques.

In some implementations, the mobility manager 132 requests an updated location of the subscriber device 106. In this case, the mobility manager 132 may communicate with the subscriber device 106. The subscriber device 106 may include a communication interface 120 that is capable of communicating with the wireless carrier network. The mobility manager 132 may transmit a request to the communication interface 120 requesting updated location data. The updated location data may include an updated IP address for the subscriber device 106. In some implementations, the mobility manager 132 may request an updated location if the location stored in the subscriber device locations storage 134 has not been updated within a certain period of time, such as two hours In stage G, the mobility manager 132 provides data indicating that the subscriber device 106 is in the vicinity of the streaming device 102. In some implementations, the mobility manager 106 may identify the IP address of the subscriber device 106. In some implementations, the mobility manager 106 may identify an approximate physical location of the subscriber device 106. The approximate physical location may be based on the base station that the subscriber device 106 is connected to or may be based on triangulations using multiple base stations near the subscriber device 106. The mobility manager 132 may compare this approximate physical location to the location of the streaming device The credential manager 136 receives the data indicating that the subscriber device 106 is in the vicinity of the streaming device 102. In stage H, the credential manager 136 accesses the user identifiers storage 138 to determine the user identifier that corresponds to the subscriber device 106. In the user identifiers storage 138, data identifying subscriber devices (including the data identifying the subscriber device 106) is associated with user identifiers (including the user identifier that corresponds to the subscriber device 106), and user identifiers (including the user identifier that corresponds to the subscriber device 106) are linked to users (including the user 104), for example in a relational database. Even if the user 104 purchased a new subscriber device, the user identifier would be linked to the new subscriber device of the user 104.

If the user identifier that corresponds to the subscriber device 106 exists in the user identifiers storage 138, the user identifier is returned in response to the request. In stage I, the credential manager 136 accesses the user profiles storage 140 that stores the profile data for each of the user identifiers. Each profile may include account information for the user such as the user's name, email address, username for the wireless carrier network, phone number, most recent log in through the subscriber application 118, account status, zip code, subscriptions, and/or any other information. The credential manager 136 accesses the profile for the user identifier of the user 104 if it exists in the user profiles storage 140. The credential manager 136 determines whether the profile includes data indicating that the user 104 is authorized to access the streaming service 112. The user 104 may be authorized to access the streaming service 112 based on the user 104 paying a subscription fee to the owner or operator of the streaming service 112.

If the credential manager 136 determines that the profile for the user identifier of the user 104 indicates that the user 104 has a valid subscription to the streaming service 112, then the credential manager 136 generates authentication data 142 indicating that the user 104 is authorized to access the streaming service 112. In stage J, the credential manager 136 provides the authentication data 142 to the streaming service 112. The authentication data 142 identifies and is used to authenticate the user 104 to the streaming service. The credential manager 136 or another component of the network server 110 may generate the authentication data 142 based on the credentials 122 provided by the user 104 when the user 104 logged in to the subscriber application 118 on the subscriber device 106. As noted above, the user 104 may have been logged in to the subscriber application 118 for several days before attempting to access the streaming service 112. As an example, the authentication data 142 may include data identifying the streaming device 102 and data indicating that the streaming device 102 is authorized to access the streaming service 112. In some implementations, the authentication data 142 may include data identifying the user 104, data indicating that the user 104 has valid subscription to the streaming service 112, and/or data indicating that the subscriber device 106 and/or the user 104 is in the vicinity of the streaming device 102.

If the credential manager 136 determines that the profile for the user identifier of the user 104 indicates that the user 104 does not have a valid subscription to the streaming service 112, then the credential manager 136 may provide an indication to the streaming service 112 that the user 104 is near, or in the vicinity of, the streaming device 102 and does not have a valid subscription to the streaming service 112. In this case, the streaming service 112 may present a subscription offer to the user 104 through the streaming device 102. In some implementations, the streaming service 112 may request that the network server 110 present a subscription offer to the user 104 through the streaming device 102. If the user 104 accepts a subscription offer through the subscriber device 106 or through the streaming device 102, then the credential manager 136 may provide the authentication data 142 to the streaming service 112. If the user 104 accepts the subscription offer through the streaming device 102, then the streaming service 112 may provide data indicating that the user 104 accepted the subscription offer to the credential manager 136. In response, credential manager 136 may update the profile of the user 104 in the user profiles storage 140.

The user authenticator 126 receives the access token 142 from the credential manager. With the access token 142, the streaming service 112 grants the streaming device 102 access to the media catalog 144. The user 104 is able to select an item of media content from the media catalog 144. In stage K, the streaming service 112 streams the item of media content 146 to the streaming device 102.

In some implementations, the network server 110 may be configured to distinguish between users in order to provide different users with different levels of access to the media catalog 144 and/or the ability to make purchases from the media catalog. As noted above, each account with the wireless carrier network can include more than one subscriber device. Some subscriber devices may be primary devices and others may be secondary devices. Primary users may use the primary devices or secondary devices and secondary users may use the secondary devices. In the example of a family, the subscriber devices of the parents may be the primary devices and the subscriber devices of the children may be the secondary devices. This distinction may be stored in the user profiles storage 140 in association with each user identifier. For example, the user profile for the user identifier of user 104 may indicate that user 104 is a primary user.

In some implementations and in stage I, the credential manger 136 may request information indicating a type of user that the user 104 is. The credential manager 136 may determine that the user profile of the user 104 indicates that user 104 is a primary user. In this case, the credential manager 136 may determine that the primary user should have access to the full catalog of media content from the streaming service 112, and the process may continue as described above. In some implementations and in stage I, the credential manager may determine that the user profile of the user 104 indicates that the user 104 is a secondary user. In this case, the credential manager 136 may determine that the secondary user should have access to a limited catalog of media content from the streaming service 112. The credential manager 136 generates an authentication data 142 that indicates to the streaming service 112 to provide access to only part of the media catalog 144. In some implementations and in stage J, the credential manager 142 provides this authentication data 142 to the user authenticator 126 of the streaming service. Based on this authentication data 142, the streaming service 112 allows the user 104 to select from only part of the media catalog 144.

In some implementations, the mobility manager 132 may determine that more than one subscriber device is connected to the same home Wi-Fi network as the streaming device 102. In this case, the mobility manager 132 determines whether there is likely more than one user attempting to view media content on the streaming device 102 and/or whether one of the users is in another room of the house and likely not attempting to view media content on the streaming device 102. The mobility manager 132 may request that each of the subscriber devices on the home Wi-Fi network attempts to communicate with the streaming device 102. The subscriber devices may use short-range radio or another direct communication method to communicate with the streaming device 102. For example, the subscriber device 106 may use the communication interface 120 to communicate with the streaming device 102 through the communication interface 116. Based on the time that it takes for each subscriber device to receive a reply from the streaming device 112, the mobility manager 132 determines which subscriber devices are closest to the streaming device 102. Based on the subscriber devices that are closest to the streaming device 102, the credential manager determines the status of each corresponding user and generates an appropriate access token 142.

In some implementations and in stage F, the mobility manger 132 may determine that three subscriber devices are connected to the same network as the streaming device 102. The three subscriber devices include the subscriber device 106, a second subscriber device, and a third subscriber device. The mobility manager 132 may request that each of the subscriber devices attempts to directly communicate with the streaming device 102. The mobility manager 132 receives data from the subscriber device 106 indicating that the streaming device 102 responded in thirty milliseconds, data from the second subscriber device indicating that the streaming device 102 did not respond, and data from the third subscriber device indicating that the streaming device 102 responded in thirty three milliseconds. The mobility manger 132 may use a threshold of five milliseconds to determine whether different subscriber devices are in approximately the same location. The mobility manger 132 may determine that subscriber device 106 and the third subscriber device are in approximately the same location because the response times were less than a threshold apart. Because the streaming device 102 did not respond to the second subscriber device, the mobility manger 132 may determine that the second subscriber device is not near enough to the streaming device 102. In subsequent interactions between a user and the streaming device 112, the mobility manager 132 may determine again which subscriber devices are nearest to the streaming device 102. It may be the case that the second subscriber device is the subscriber device nearest to the streaming device 112.

In some implementations and in stage G, the mobility manager 132 provides the credential manager 136 data indicating that the subscriber device 106 and the third subscriber device are on the same network as the streaming device 102. In an alternative stage H, the credential manager 136 accesses the user identifiers storage 138 and identifies the user identifiers that correspond to the subscriber device 106 and the third subscriber device. In an alternative stage I, the credential manager 136 accesses the user profiles storage 140. By way of illustration, suppose that the credential manager 136 determines that the age of the user 104 of the subscriber device 106 is ten years old, and that the age of the user of the third subscriber device is forty-two years old. The credential manager 136 also determines that both subscriber devices are on the same wireless network carrier account with a valid subscription to the streaming service 112. Based on these ages, the credential manger 136 generates an access token 142 based on the user with the higher level of access to the streaming service 112, which is the older user. In a modified stage J, the access token 142 instructs the streaming service 112 to grant the streaming device 102 access to the full media catalog 144.

In some implementations, the streaming device 102 may detect the presence of the subscriber device 106 through the wireless home network or a peer to peer connection such as short-range radio. The subscriber device 106 may receive, directly from the streaming device 102, a request for credentials for the streaming application 114. The subscriber application 118 may provide the credentials that the user 104 used to log in to the subscriber application 118 or other credentials to the streaming application 114. The streaming application 114 may provide the streaming service 112 with those credentials to log in to the streaming service 112. The user authenticator 126 may determine whether the credentials correspond to a valid subscription with the streaming service 112. If the subscription is valid, then the streaming service 112 may provide the streaming device 102 access to the media catalog 144.

Figure 2:
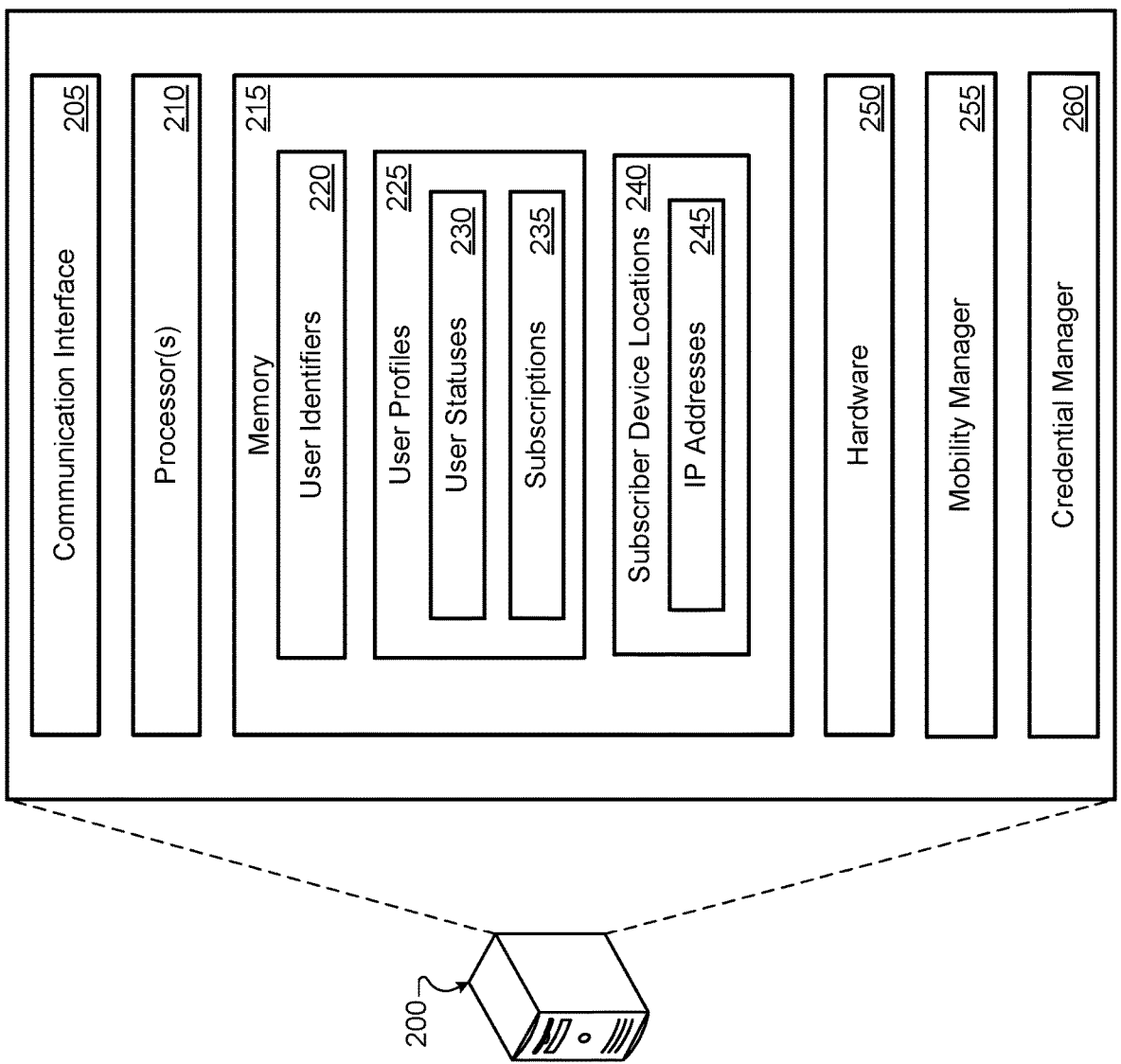
FIG. 2 illustrates an example server that determines when a subscriber device of a user is in the vicinity of a streaming device and automatically provides data to authenticate the user to a streaming service.

FIG. 2 illustrates an example server 200 that determines when a subscriber device of a user is in the vicinity of a streaming device and automatically provides data to authenticate the user to a streaming service. The server 200 may be any type of computing device that is configured to manage a wireless network. For example, the server 200 may be similar to network server 110 of FIG. 1 and be part of the core network 148. In some implementations, the server 200 may be a virtual computing device in the form of virtual machines or software containers that are hosted in a cloud in communication with disaggregated storage devices. The components of server 200 may be implemented in a single computing device or distributed over multiple computing devices.

The server 200 may include a communication interface 205, one or more processors 210, memory 215, and hardware 250. The communication interface 205 may include wireless and/or wired communication components that enable the server 200 to transmit data to and receive data from other networked devices. The hardware 250 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a credential manager 260. The credential manager 260 may be similar to the credential manager 136 of FIG. 1. The credential manager 260 may be configured to receive and authenticate credentials received from subscriber devices through a subscriber application. Each subscriber device may include a subscriber application that the user of the subscriber device accesses to manage the user's account with the wireless network carrier. A user may provide credentials to the subscriber application, and the credential manager 260 receives those credentials from the subscriber application. The credential manager 260 authenticates the user and provides access to the user's account.

The credential manger 260 may also be configured to authenticate the user to other systems and devices. The credential manager 260 may provide access tokens to the other systems and devices in response to a request from the user, in response to a request from the other systems or devices, and/or in response to determining that the user is likely attempting to access the other systems and devices. For example, the credential manager 260 may receive a request to provide data authenticating a user to a streaming service. The credential manager 260 may receive data identifying the user with the request or access the data identifying the user from another component of the server 200. The credential manager 260 determines that the user has a valid account with the streaming service, then the credential manger 260 may provide data authenticating the user to the streaming service.

To determine whether a user is authorized to access another system or device, the credential manager 260 may access the user identifiers 220 and the user profiles 225 that are stored in the memory 215. The user identifiers 220 may store the user identifiers for each of the users of the wireless network carrier. A user identifier may be a unique identifier for each user of the wireless network carrier. The user identifier may correspond to a particular user and may not change if the user leaves the wireless network carrier and returns, or if the user purchases a new subscriber device. Each user identifier may be mapped to data identifying the current subscriber device or devices that the user currently uses to access the wireless carrier network. In this case, the credential manager 260 may determine the user identifier for a user based on an IMEI number, MAC access, ICCID number, MEID number, or any other similar identifier.

The user profiles 225 may store data for each user identifier. The data stored may include the user's name, email address, username for the wireless carrier network, phone number, most recent log in through the subscriber application, account status, user status 230, zip code, subscriptions 235, and/or any other information. The server 200 may update the profile for a specific user as the server 200 receives the information. For example, the server 200 may receive information indicating that the user subscribed to a new streaming service. The server 200 may update the subscriptions 235 with data indicating that the user subscribed to the streaming service. In some implementations, the subscriptions 235 may include data indicating when the subscription will expire. At that point, the server 200 may request verification whether the subscription is still valid. The server 200 may update the subscriptions 235 with a new expiration date or remove the indication that the subscription is valid.

The user profiles 225 includes the user statuses 230 that indicates the status of the user on the user's account. Each account with the wireless carrier network may include more than one subscriber device. For example, a family may have a subscriber device for each member. Each parent may have a subscriber device and each child may have a subscriber device. These subscriber devices may be part of the same account with the wireless carrier network. Each subscriber device may have a different status on the account. The subscriber devices of the parents may be primary devices. These subscriber devices may have a higher privilege level for making changes to the account, such as being permitted to make purchases. The subscriber devices of the children may be secondary devices. These subscriber devices may have a lower privilege for making changes to the account, such as being prohibited from making purchases or requiring approval from a primary device.

Because some user profiles 225 may be part of the same account, some of the data in multiple user profiles may be updated in response to a change to one user profile. For example, if the server 200 receives data indicating that a user subscribed to a streaming service and the subscription was a family subscription, then the server 200 may update each of the user profiles on that account. The server 200 may add data indicating the valid subscription to the primary devices and to the secondary devices. In some instances, the user profile may indicate an access level for the streaming service. The user profiles 225 that correspond to the users with the primary devices may indicate access to the full catalog of the streaming service and the ability to make purchases from the streaming service. The user profiles 225 that correspond to the users with the secondary devices may indicate access to a limited catalog and prevent making purchases from the streaming service.

The one or more processors 210 may implement a mobility manager 255. The mobility manager 255 may be similar to the mobility manager 132 of FIG. 1. The mobility manager 255 may be configured to monitor the location of a subscriber device that is connected to the server 200 through a wireless base station such as a gNodeB. The location of the subscriber device may include the wireless base station to which the subscriber device is connected, an IP address of the network to which the subscriber device is connected, and/or GPS data received from the subscriber device. The mobility manager 255 may store the location data in the subscriber device locations 240 that is implemented by the memory 215.

The mobility manager 132 may receive some of the location data from the credential manager 136. The credential manager 136 may receive an IP address and/or GPS data from the subscriber device through the subscriber application. The subscriber application may allow the credential manager 136 to monitor the IP address and/or GPS data of the subscriber device. The credential manager 136 may provide the IP address and/or the GPS data to the mobility manager 132. The mobility manager 132 may store the IP address and/or the GPS data in the subscriber device locations 240 and the IP addresses 245. The subscriber device locations 240 and the IP addresses 245 may be organized such that the mobility manager 132 can access the location and/or IP address of a subscriber device using a device identifier.

The mobility manager 132 may determine the base station that each subscriber device is connected to and store data identifying the current base station in the subscriber device locations 240. In some instances, the entry in the subscriber device locations 240 for each subscriber device on the wireless carrier network may not include one or more of the current base station, IP address, and GPS data. For example, a subscriber device may not be currently utilizing its GPS receiver, or the user may have opted out of sharing the GPS data. In this case, the subscriber device locations 240 may not include GPS data for that subscriber device. In some implementations, the subscriber device may not be connected to a Wi-Fi network. In this case, the IP address 245 may indicate an IP address provided by the wireless carrier network. If the mobility manager 132 receives an IP address from the credential manager 136 and an indication that the subscriber device is connected to a Wi-Fi network, then the mobility manager 136 may overwrite the IP address provided by the wireless carrier network and replace it with the IP address of the Wi-Fi network.

In some implementations, the subscriber device locations 240 may include historical data in additional to real-time data. The historical data may include the previous base stations, IP addresses, and GPS data. The historical data may also include timestamps that indicate the date and time when the subscriber device was connected to a base station, provided the GPS data, and/or had the IP address. In some implementations, and when choosing between multiple subscriber devices that are likely nearby the streaming device, the mobility manager 255 and/or the credential manager 260 may use the historical data to help determine the subscriber device from which to base the authentication data. For example, when selecting between two subscriber devices that are on the same home network as the streaming device, the credential manager 260 may select the subscriber device that has been on the home network the longest, which may indicate that subscriber device belongs to a person who lives in the home that has the streaming device.

In some implementations, the subscriber device locations 240 may also include a network name of the Wi-Fi network that the subscriber device is connected to. The credential manager 260 may receive the network name through the subscriber application on the subscriber device. The credential manager 260 may provide the network name to the mobility manager 255. The mobility manager 255 may store the network name in the subscriber device locations 240 along with a timestamp.

With data provided by the mobility manager 255 from the subscriber device locations 240, the user profiles 225, and the user identifier 220, the credential manager 260 may be configured to determine whether to provide access tokens to other systems and devices. The credential manger 260 may receive a location of the system that a user is attempting to access and receive data indicating a location of subscriber devices that are connected to the same network as the system. The credential manager 260 may provide an access token to the system if the system determines that the user of the subscriber device has a valid account with the system. In some implementations, the credential manager 260 may indicate the level of access that the user should have to the system. If the user is a primary account holder, then the credential manager 260 may provide an access token that specifies full access to the system. If the user is a secondary account holder, then the credential manager 260 may provide an access token that specified limited address to the system.

Figure 3:
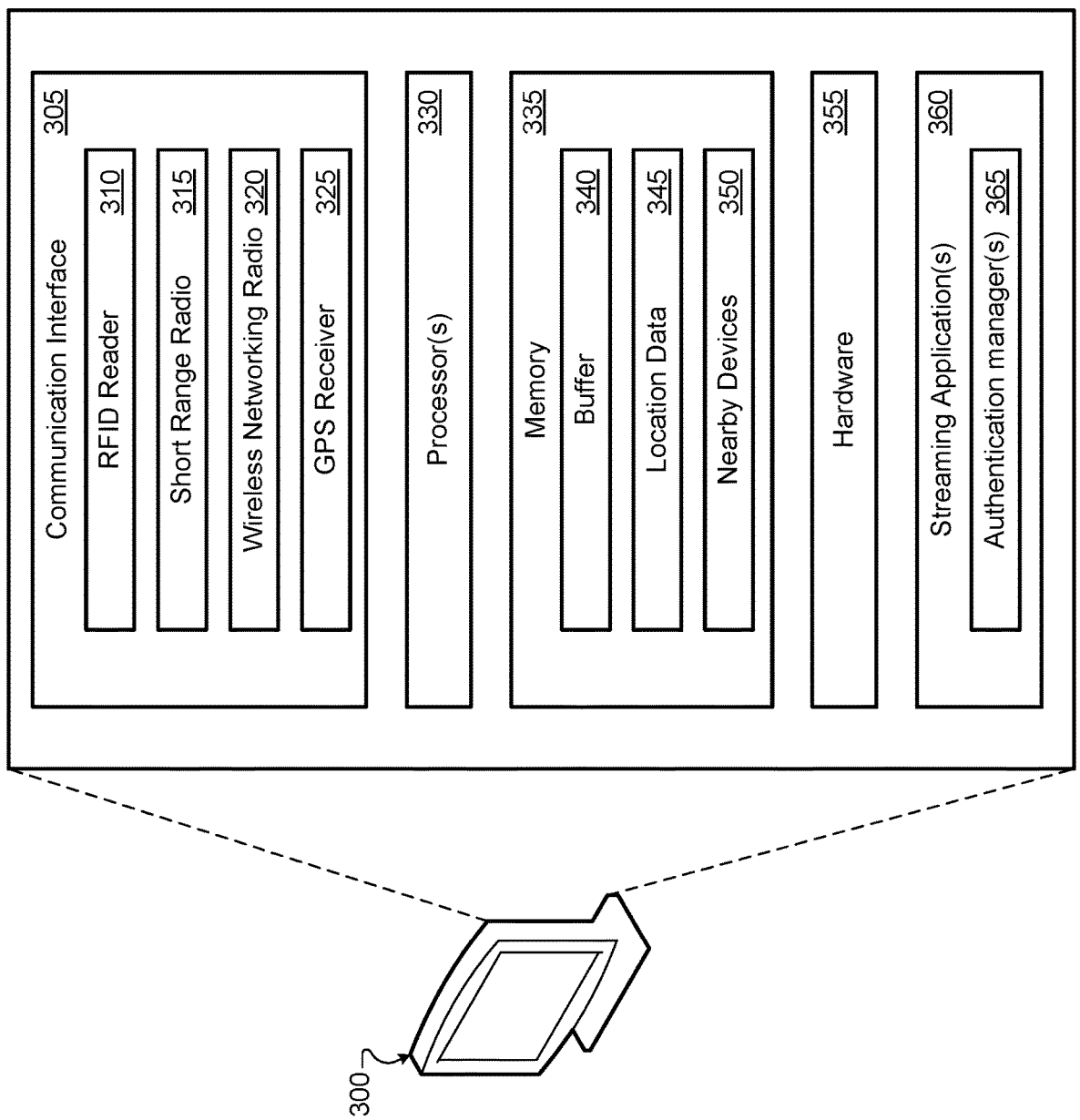
FIG. 3 illustrates an example streaming device that is configured to stream media content from various streaming services.

FIG. 3 illustrates an example streaming device 300 that is configured to stream media content from various streaming services. The streaming device 300 may be any type of computing device that is configured to display media content. For example, the streaming device 300 may be similar to the streaming device 102 of FIG. 1. The streaming device 300 may be a television, laptop computer, mobile phone, desktop computer, a tablet, a digital media player, a streaming box, or any other type of device designed for the storage, playback, and/or viewing of digital media content. The components of streaming device 300 may be implemented in a single computing device or distributed over multiple computing devices that may be in the form of virtual machines or software containers that are hosted in a cloud in communication with disaggregated storage devices.

The streaming device 300 may include a communication interface 305, one or more processors 330, memory 335, and hardware 355. The communication interface 305 may include wireless and/or wired communication components that enable the streaming device 300 to transmit data to and receive data from other networked devices. The hardware 355 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 335 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 330 may execute one or more streaming applications 360. Each of the one or more streaming applications 360 may be configured to stream media content from a different streaming service. In some implementations, each streaming service may require that the user pay a subscription fee to stream media content from the media catalog of the streaming service. For example, a streaming service may require that the user pay ten dollars per month to stream movies from the media catalog of the streaming service. If the user does not continue to pay the subscription fee, then the user may not be able to continue accessing the media catalog.

In some implementations, a streaming service has various levels of access, and a user can use the streaming application 360 to access each level depending on the level of access of the user. A streaming service may have three access levels. A first level may be the highest fee. If a user pays the highest fee, then the user may be able to access the full media catalog through the streaming application 360. If the user pays a middle fee, then the user may be able to access a portion of the full media catalog through the streaming application 360. If the user pays the lowest fee, then the user may be able to access an even smaller portion of the full media catalog through the streaming application 360. In some instances, the streaming application 360 may allow users who do not pay a fee to access a portion of the full media catalog through the streaming application 360. In some cases, if the user is accessing the portion of the media catalog for free, then the streaming service may include advertisements in the content provided to the streaming application 360. In some instances, the streaming application 360 may allow a certain class of users to access a portion of the full media catalog through the streaming application 360 for free. The class of users may be those users who have an account with a wireless carrier network, users who are at a certain location, users who are at a hotel, users who are accessing the streaming application 360 during a specific time frame, and other similar classes of users.

Each of the streaming applications 360 may include an authentication manager 365. The authentication manager 365 may be configured to communicate with the streaming service to authenticate the streaming device 300 and/or the user to the streaming service. The authentication manager 365 may provide a username and password, an access token, or other authentication data. In some instances, the authentication manager 365 may provide data identifying a location of the streaming device 300. The location may include an IP address of the streaming device 300, a GPS location of the streaming device 300, data identifying a nearby device, data identifying a location of the nearby device, and/or any other location information. In some instances, the authentication manager 365 may provide data identifying the user. In some instances, the authentication manager 365 may provide a request for the streaming service to automatically authenticate the streaming device 300 and/or determine a level of access for the streaming device 300 to have to the streaming service.

The memory 335 may include a buffer 340 that is configured to buffer media content received from the streaming service. The streaming service may specify the size of the buffer. In some implementations, the memory 335 may store some of the media content of the streaming service so the streaming device 300 can output the media content to the user without being connected to the streaming service.

The communication interface 305 may include various wireless and/or wired communication components that enable the streaming device 300 to communicate with devices that are nearby (e.g., less than twenty meters) and devices that are on the same or different networks. The communication interface 305 may include an RFID reader 310. The RFID reader is configured to detect the presence of an RFID tag that may be connected to a device. The RFID reader may detect an RFID tag, and the processor 330 may store data identifying that RFID tag and/or data identifying the device attached to the RFID tag in the nearby devices storage 350 of memory 335. In some implementations, the streaming device 300 may include an RFID tag that RFID readers of other devices are able to detect.

The communication interface 305 may include a short-range radio 315 that is configured to communicate directly with devices that are within the range of the short-range radio (e.g., fifteen meters). The short-range radio 315 may communicate with nearby devices, and exchange data identifying each device and other data. The processor 330 may store data identifying the devices with which the short-range radio 315 communicates. In some implementations, the short-range radio 315 may receive data indicating a location of the other device. The processor 330 may store the data indicating the location of the other device in the location data storage 345 of memory 335. The location of another device that the streaming device 300 is able to communicate with, over short-range radio, provides insight into the location of the streaming device 300.

The communication interface 305 may include a wireless networking radio 320 that is configured to communicate with nearby wireless networks. The wireless networking radio 320 may communicate with a wireless access point of a wireless network. In some implementations, the wireless networking radio 320 may communicate directly with nearby devices using a peer to peer communication protocol. The wireless networking radio 320 may receive location data that may include an IP address of the wireless network and/or data identifying a location of the nearby devices. The processor 330 may store the data indicating the location of the other devices and/or the IP address of the wireless network in the location data storage 345 of memory 335.

The communication interface 305 may include a GPS receiver 325 that is configured to receive GPS data and determine a location of the streaming device. The processor 330 may store the GPS location data in the location data storage 345 of memory 335.

In some implementations, the communication interface 305 may include a cellular radio that is configured to communicate with wireless cellular networks. The cellular radio may receive and transmit data over the wireless cellular network. In some implementations, the wireless cellular network may provide location data indicating the location of the streaming device 300 and/or data indicating a location of a base station with which the cellular radio is communicating. The processor 330 may store the location data in the location data storage 345.

In some implementations, a home, building, or other structure may have multiple streaming devices 300 located throughout the structure. For example, a hotel may have a streaming device 300 in each room of the hotel. Each streaming device 300 may store an identifier that associates the streaming device 300 with the room where the streaming device 300 is located. A computing system of the hotel may store data indicating which guests are in which rooms. If the computing system of the hotel, the streaming device 300 in a room, the network server, and the streaming service communicate, then the user may be able to access the streaming application 360 without manually entering credentials into the streaming device 300. If the user subscribes to the streaming service, then the user may access the full catalog of the streaming service. If the user does not subscribe to the streaming service, then the user may access a limited catalog of the streaming service.

The computing system of the hotel may provide data identifying a guest of a particular room and data identifying the streaming device in the particular room to the streaming service. The streaming service may request data from the network server related to the subscription status of the visitor for the streaming service. The network server provides data indicating the subscription status to the streaming service. If the user has a subscription to the streaming service, then the streaming service may provide the streaming device in the particular room access to the media catalog. If the user does not have a subscription to the streaming service, then the streaming service may provide the streaming device in the particular room access to a portion of the media catalog. In some implementations, the streaming service may provide the streaming device in the particular room access to the portion of the media catalog if the user has an account with a particular wireless carrier network.

Figure 4:
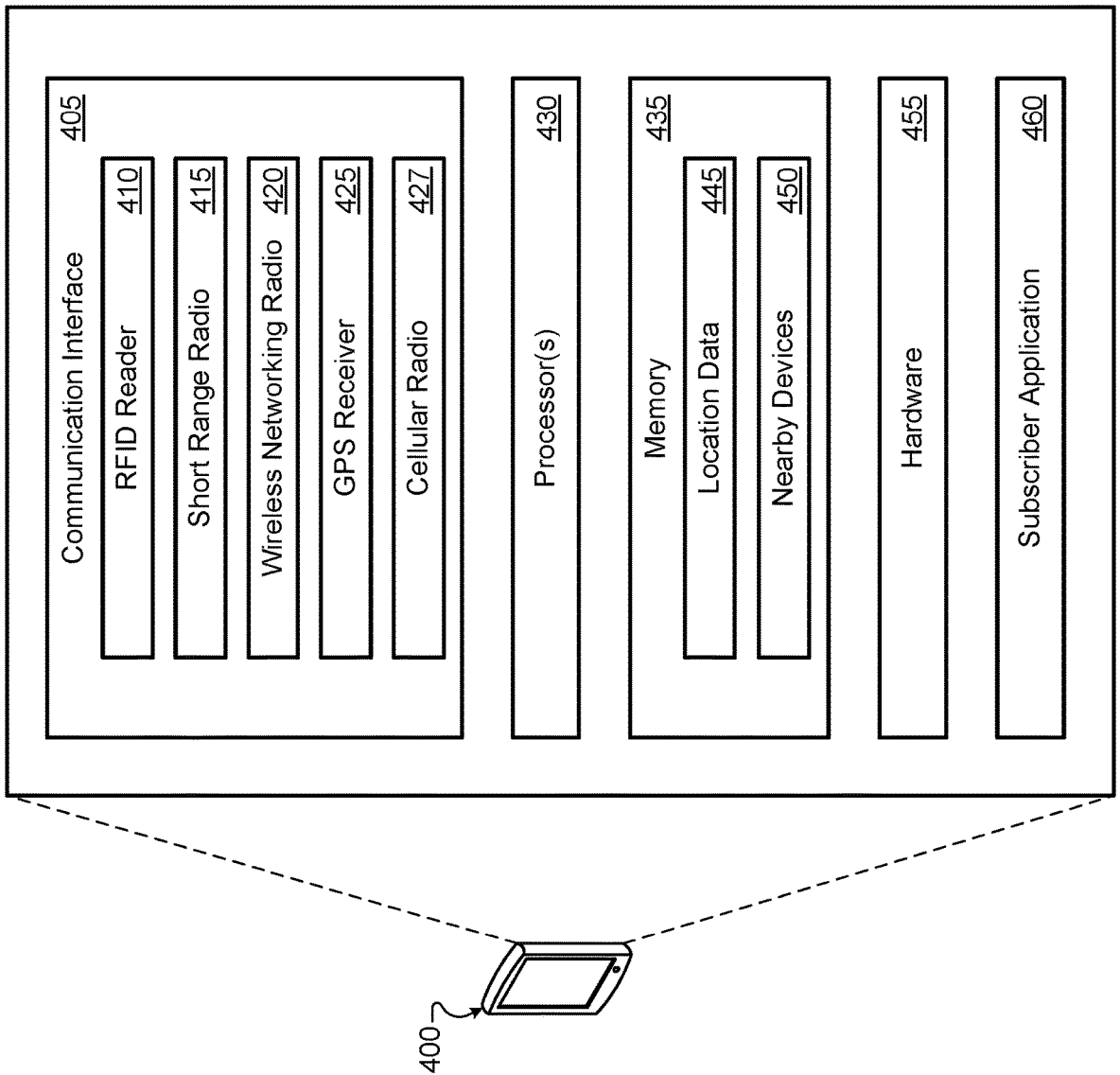
FIG. 4 illustrates an example subscriber device that is configured to communicate with wireless carrier networks and other wireless networks.

FIG. 4 illustrates an example subscriber device 400 that is configured to communicate with wireless carrier networks and other wireless networks. The subscriber device 400 may be any type of computing device that is configured to communicate with a wireless carrier network. For example, the subscriber device 400 may be similar to the subscriber device 106 of FIG. 1. The subscriber device 400 may be a feature phone, a smartphone, a tablet computer, a phablet, an embedded computer system, a UAV, a robot, a multimedia recording system, or any other device that is capable of accessing wireless communication services that are provided by multiple types of communication networks. The components of subscriber device 400 may be implemented in a single computing device or distributed over multiple computing devices that may be in the form of virtual machines or software containers that are hosted in a cloud in communication with disaggregated storage devices.

The subscriber device 400 may include a communication interface 405, one or more processors 430, memory 435, and hardware 455. The communication interface 305 may include wireless and/or wired communication components that enable the subscriber device 400 to transmit data to and receive data from other networked devices. The hardware 455 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 435 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 430 may execute a subscriber application 360. The subscriber application 430 may allow a user to access account management tools for the user's wireless carrier account. The user may view the amount of data that the user has remaining in the billing period. If the user is a primary user, then the user may be able to change the access privileges of other users on the same account, such as secondary users. The user may be able to view and manage any subscriptions to various subscription-based services such as streaming services. The user may provide a username and password or another type of authentication data to the subscriber application 460 to log into the subscriber application 460. With the permission of the user, the subscriber application 460 may provide data authenticating the user to other computing devices and/or applications.

The communication interface 405 may include various wireless and/or wired communication components that enable the subscriber device 400 to communicate with devices that are nearby (e.g., less than twenty meters) and devices that are on the same or different networks. The communication interface 405 may include an RFID reader 410. The RFID reader 410 is configured to detect the presence of an RFID tag that may be connected to a device or another item. The RFID reader 410 may detect an RFID tag, and the processor 430 may store data identifying that RFID tag and/or data identifying the object attached to the RFID tag in the nearby devices storage 450 of memory 435. In some implementations, the subscriber device 400 may include an RFID tag that RFID readers of other devices are able to detect.

The communication interface 405 may include a short-range radio 415 that is configured to communicate directly with devices that are within the range of the short-range radio (e.g., fifteen meters). The short-range radio 415 may communicate with nearby devices, and exchange data identifying each device and other data. The processor 430 may store data identifying the devices with which the short-range radio 415 communicates. In some implementations, the short-range radio 415 may receive data indicating a location of the other device. The processor 430 may store the data indicating the location of the other device in the location data storage 445 of memory 435. The location of another device that the subscriber device 400 is able to communicate with, over short-range radio, provides insight into the location of the subscriber device 400.

The communication interface 405 may include a wireless networking radio 420 that is configured to communicate with nearby wireless networks. The wireless networking radio 420 may communicate with a wireless access point of a wireless network. In some implementations, the wireless networking radio 420 may communicate directly with nearby devices using a peer to peer communication protocol. The wireless networking radio 420 may receive location data that may include an IP address of the wireless network and/or data identifying a location of the nearby devices. The processor 430 may store the data indicating the location of the other devices and/or the IP address of the wireless network in the location data storage 445 of memory 435.

The communication interface 405 may include a GPS receiver 425 that is configured to receive GPS data and determine a location of the subscriber device 400. The processor 430 may store the GPS location data in the location data storage 445 of memory 435.

The communication interface 405 may include a cellular radio 427 that is configured to communicate with wireless carrier networks. The cellular radio 427 may receive and transmit data over the wireless carrier network. In some implementations, the wireless carrier network may provide location data indicating the location of the subscriber device 400 and/or data indicating a location of a base station with which the cellular radio is communicating. The processor 430 may store the location data in the location data storage 445.

Figure 5:
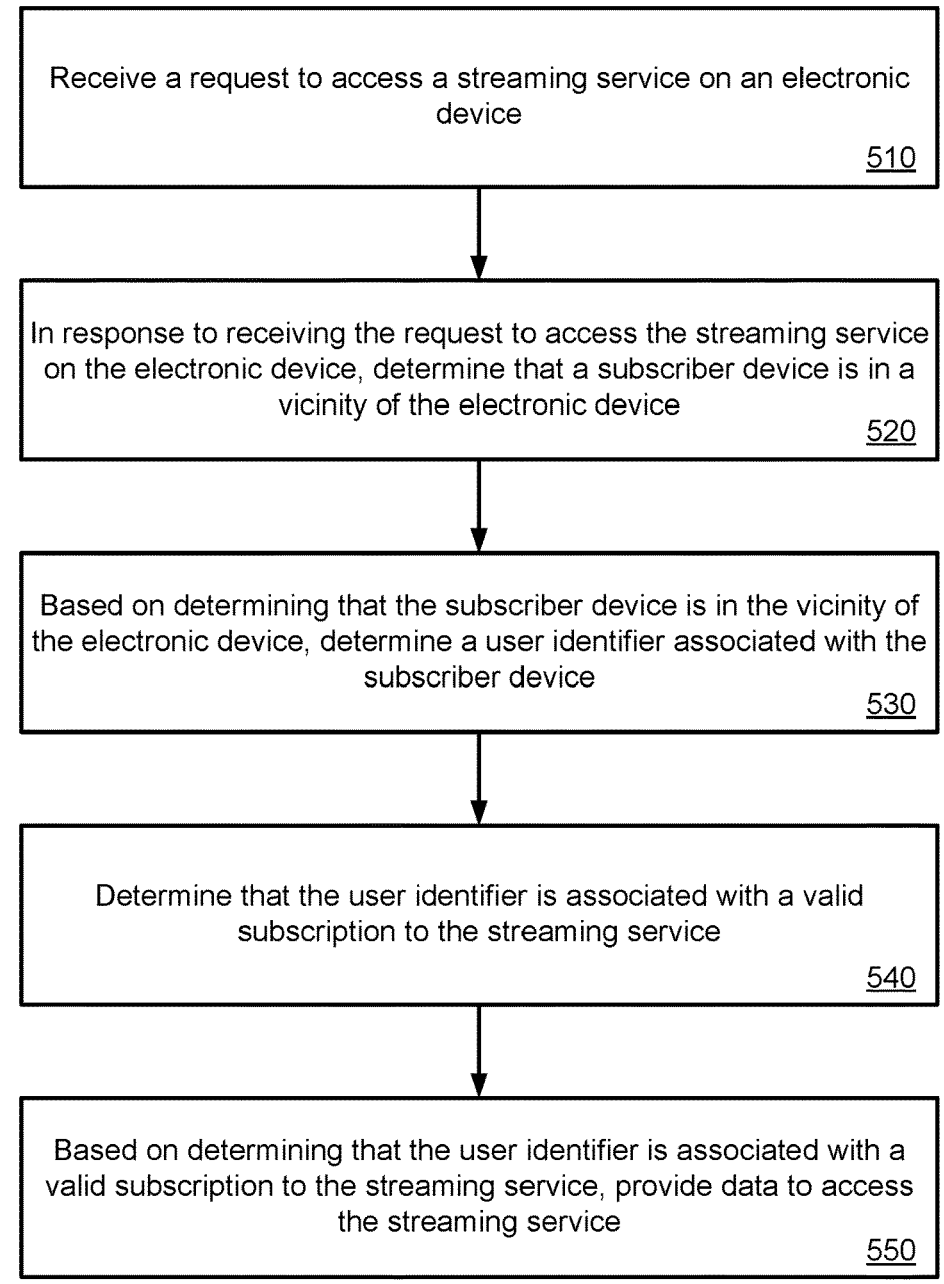
FIG. 5 is a flowchart of an example process automatically authenticating a user on a streaming service when the subscriber device of the user is in the vicinity of the streaming device.

FIG. 5 is a flowchart of an example process 500 automatically authenticating a user on a streaming service when the subscriber device of the user is in the vicinity of the streaming device. In general, the process 500 automatically provides a user access to a streaming service when the user's subscriber device is in a vicinity of the streaming device to which the user is attempting to access the streaming service. The process 500 determines that the user has a valid subscription to the streaming service and provides an access token to the streaming service. The process 500 will be described as being performed by the network server 110 of FIG. 1 and will include references to other components in FIG. 1. The process 500 may also be performed by the server 200 of FIG. 2.

The network server 110 receives a request to access a streaming service 112 on an electronic device (510). A user may be attempting to access the streaming service 112 through the electronic device. The electronic device may be any type of device that is capable of streaming media content. For example, the electronic device may be similar to streaming device 102. The user may access a streaming application that transmits a request to the streaming service 112 for credentials or an access token to grant the streaming application access to the media catalog of the streaming service 112. The streaming service 112 may transmit a request for the credentials or the access token to the network server 110.

In some implementations, the streaming service 112 may determine that the electronic device is authorized to access the media catalog of the streaming service 112. This may occur without communicating with the network server 110. In this case, the streaming service 112 may receive, from the electronic device, data identifying the electronic device, an access token, the IP address of the electronic device, and/or additional data. The streaming service 112 may store data identifying users who are authorized to access the media catalog. If the streaming service 112 determines that the electronic device is authorized to access the media catalog, then the streaming service 112 may grant the electronic device access to the media catalog. If the streaming service 112 is unable to determine that the electronic device is authorized to access the media catalog, then the streaming service 112 may request that the network server 110 determine whether the electronic device is authorized to access the media catalog.

In some implementations, the streaming service 112 may transmit a request for the credentials or the access token to the network server 110 in response to each request from the electronic device. In some implementations, the streaming service 112 may transmit a request for updated credentials or an updated access token to the network server after a certain period of time, such as an hour, even if the electronic device is still streaming media content. This may ensure that the content provided by the streaming service is appropriate for the likely user. For example, if an adult was watching the streaming service 112 on the electronic device earlier in the day and a child watches later in the day, then requesting updated credentials or an updated access token may ensure that the available content is age appropriate.

In response to receiving the request to access the streaming service 112 on the electronic device, the network server 110 determines that a subscriber device 106 is in a vicinity of the electronic device (520). The request to access the streaming service 112 may include an IP address of the electronic device. In some instances, the request may also include a name of the network to which the electronic device is connected, such as the SSID. The network server 110 accesses the locations of the subscriber devices connected to network server 110. The network server 110 may determine that the subscriber device 106 is connected to the same network as the electronic device. In some implementations, the network server 110 may verify that the subscriber device 106 is in a vicinity of the electronic device by requesting that the subscriber device 106 attempt to communicate with the electronic device over short-range radio. If the subscriber device 106 is able to communicate with the electronic device over short-range radio, then the network server 110 may be more confident that the subscriber device 106 is in a vicinity of the electronic device.

Based on determining that the subscriber device 106 is in the vicinity of the electronic device, the network server 110 determines a user identifier associated with the subscriber device 106 (530). The network server 110 may store data that maps identifiers for each subscriber device to a respective user identifier. A user identifier corresponds to a particular user and stays with the user if the user changes subscriber devices. If there is a period of time where a user does not have an active account with the wireless network carrier, the user still keeps the same user identifier upon activating a new account with the wireless network carrier. If a user has more than one subscriber device, then each one of those subscriber devices may be mapped to the same user identifier. If more than one user is on an account for the wireless network carrier, then each user will be assigned a different user identifier.

The network server 110 determines that the user identifier is associated with a valid subscription to the streaming service 112 (540). The network server 110 stores information for each user identifier. The information includes the user's name, email address, username for the wireless carrier network, phone number, most recent log in through the subscriber application, account status, zip code, birthdate, subscriptions, and/or any other similar information. The network server 110 determines that the information for the user identifier includes a valid subscription to the streaming service 112. The network server 110 generates an access token to provide to the streaming service 112. The access token may include data identifying the user.

In some implementations, the information includes data identifying the user's status on the account. A status may indicate whether the user is the primary user on the account, a secondary user on the account, or another type of user. In the example of a family with parents and children, the parents are likely to be the primary users and the children are likely to be the secondary users. The network server 110 may use the status of the user to generate the access token. The network server 110 may indicate in the access token to provide access to the full catalog of the streaming service 112 if the user is a primary account holder. The network server 110 may indicate in the access token to provide access to a limited catalog of the streaming service 112 if the user is a secondary account holder. In some implementations, the decision to provide access to the full or limited catalog is based on the age of the user.

In some implementations, network server 110 may determine that the user does not have a valid subscription to the streaming service 112. In this case, the network server 110 may generate an access token to provide the user with access to free content from the streaming service 112. Additionally, or alternatively, the network servicer 110 may instruct the streaming service 112 to provide a prompt to ask the user if the user would like to subscribe to the streaming service 112. The network server 110 may also provide a prompt for display on the subscriber device 106.

Based on determining that the user identifier is associated with a valid subscription to the streaming service 112, the network server 110 provides data to access the streaming service 112 (550). The data to access the streaming service may include the access token. The streaming service 112 may receive the access token and grant the streaming device 102 access to the media catalog of the streaming service 112 in accordance to any requirements in the access token. For example, if the access token specifies full access, then the streaming service 112 provides access to the full media catalog. If the access token specified limited free access, then the streaming service provides access to free content from the media catalog. If the access token specifies limited access, then the streaming service 112 provides access to a limited media catalog. This limited media catalog may provide more content than the free content and less content than the full media catalog. In some implementations, the streaming service 112 may limit access to content in the media catalog based on an age of the user.

In some instances, the network server 110 may determine that more than one subscriber device from the same wireless carrier network account are connected to the same home Wi-Fi network as the streaming device 102. This may be the case when the user 104 is attempting to watch television on the streaming device 102 and another user is in another room of the house. The network server 110 is able to determine that the user 104 is closer to the streaming device 102 than the other user. Based on this determination, the network server 110 provides an access token to the streaming device 102 that is consistent with the subscription status and account status of the user 104. If the user 104 is a secondary account holder and/or a child, then the network server 110 provides an access token that indicates to provide limited access to the media catalog. If the user 104 is a primary account holder and/or an adult, then the network server provides an access token that indicates to provide full access to the media catalog.

The network server 110 may be unable to determine which user is closer to the streaming device 102 based on which subscriber device is closer to the streaming device 102. The network server 110 may request that each subscriber device attempt to communicate directly with the streaming device 102. This communication may be over short-range radio, direct Wi-Fi communication, or another similar direct communication channel. The network server 110 may request that each subscriber device provide the time that it took to receive a return communication from the streaming device 102; this time may be referred to as the ping time. Based on the ping times, the network server 110 may be able to determine that the subscriber device with the shorter ping time is the one closer to the streaming device 102. The network server 110 may generate an access token based on the user of the closer subscriber device.

In some instances, the network server 110 may compare the ping times and determine that there are likely more than one users attempting to watch the television. This may be the case when the difference between the ping times is less than a threshold time and/or when the difference between the ping times is less than a percentage of at least one of the ping times. For example, if the threshold is five milliseconds, then the network server 110 would determine that two ping times of twenty-five milliseconds and twenty-eight milliseconds indicate that the two subscriber devices are in substantially the same location. The network server 110 determines that both users are likely watching television on the streaming device 102. The network server 110 generates an access token based on the user with the higher status on the wireless carrier network account.

In some instances, the network server 110 may determine that more than one subscriber device from different wireless carrier network accounts are connected to the same home Wi-Fi network as the streaming device 102. This may be the case when a user is visiting the home of another person. The network server 110 may determine that the visiting user and the home user are both located in the vicinity of the streaming device. The network server 110 may determine that the visiting user and the home user both have valid subscriptions to the streaming service. The network server 110 may generate the access token based on the home user's subscription. The network server 110 may make this selection based on the determination that the home user has been on the home Wi-Fi network for a longer period of time than the visiting user. By analyzing the historical data of the locations of the home user's subscriber device and the visiting user's subscriber device, the network server 110 may determine that the home user's subscriber device has been connected to the home Wi-Fi network for one hundred hours during the past week and the visiting user's subscriber device has been connected to the home Wi-Fi network for thirty minutes during the past week.

The network server 110, streaming device 102, and streaming service 112 may be configured to avoid a situation where the a user is granted access to the full catalog of the streaming service 112, the user watching the streaming service 112, and another user who should not have access to the full catalog attempts to access the streaming service 112. The network server 110 may avoid this situation in several ways. A first option would be for the streaming device 102 to submit a new request to authenticate the user each time the streaming device 102 is powered on. A second option would be for the streaming device 102 to submit a new user authentication request at periodic intervals, such as every thirty minutes. A third options would be for the network server 110 to monitor the location of the subscriber device 106. If the subscriber device 106 is no longer connected to the home Wi-Fi network, then the network server 110 may revoke the access token. That action may trigger the streaming service 112 to request a new access token.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device, a request to access a streaming service on an electronic device;
in response to receiving the request to access the streaming service on the electronic device, determining, by the computing device, that a subscriber device is in a vicinity of the electronic device;
based on determining that the subscriber device is in the vicinity of the electronic device, determining, by the computing device, a user identifier associated with the subscriber device;
determining, by the computing device, that the user identifier is associated with a valid subscription to the streaming service; and
based on determining that the user identifier is associated with a valid subscription to the streaming service, providing, by the computing device, data to access the streaming service.

2. The method of claim 1, wherein determining that the subscriber device is in the vicinity of the electronic device comprises:
determining that the subscriber device and the electronic device are connected to a same Wi-Fi network.

3. The method of claim 1, wherein determining that the subscriber device is in the vicinity of the electronic device comprises:
determining that the subscriber device and the electronic device are communicating over short-range radio.

4. The method of claim 1, comprising:
determining that the user identifier is associated with a primary account holder of a wireless carrier of the subscriber device,
wherein providing data to access the streaming service comprises providing data to access a full catalog of content offered by the streaming service based on determining that the user identifier is associated with a primary account holder of a wireless carrier of the subscriber device.

5. The method of claim 1, comprising:
receiving, by the computing device, an additional request to access the streaming service on the electronic device;
in response to receiving the additional request to access the streaming service on the electronic device, determining, by the computing device, that the subscriber device is not in the vicinity of the electronic device and that an additional subscriber device is in the vicinity of the electronic device;
based on determining that the additional subscriber device is in the vicinity of the electronic device, determining, by the computing device, an additional user identifier associated with the additional subscriber device;
determining, by the computing device, that the additional user identifier is associated with a secondary account holder of the wireless carrier of the subscriber device; and
determining that the additional user identifier is associated with the secondary account holder of the wireless carrier of the subscriber device, providing, by the computing device and to the electronic device, data to access a limited catalog of content offered by the streaming service.

6. The method of claim 1, comprising:
determining that the user identifier is associated with a secondary account holder of a wireless carrier of the subscriber device,
wherein providing data to access the streaming service comprises providing data to access a limited catalog of content offered by the streaming service based on determining that the user identifier is associated with the secondary account holder of the wireless carrier of the subscriber device.

7. The method of claim 1, comprising:
receiving, by the computing device, an additional request to access an additional streaming service on the electronic device;
in response to receiving the additional request to access the additional streaming service on the electronic device, determining, by the computing device, that an additional subscriber device is in the vicinity of the electronic device;
based on determining that the additional subscriber device is in the vicinity of the electronic device, determining, by the computing device, an additional user identifier associated with the additional subscriber device;
determining, by the computing device, that the additional user identifier is not associated with a valid subscription to the additional streaming service; and
based on determining that the additional user identifier is not associated with a valid subscription to the additional streaming service, providing, by the computing device and to the electronic device, data to access a limited catalog of content offered by the streaming service.

8. The method of claim 1, comprising:
in response to receiving the request to access the streaming service on the electronic device, determining, by the computing device, that an additional subscriber device is in the vicinity of the electronic device;
based on determining that the subscriber device is in the vicinity of the electronic device, determining, by the computing device, an additional user identifier associated with the additional subscriber device;
determining that the user identifier is associated with a primary account holder of a wireless carrier of the subscriber device;
determining that the additional user identifier is associated with a secondary account holder of the wireless carrier of the additional subscriber device; and
based on determining that the user identifier is associated with the primary account holder and the additional user identifier is associated with a secondary account holder, determining, by the computing device, that the electronic device is closer to the subscriber device than the additional subscriber device,
wherein providing data to access the streaming service is further based on determining that the electronic device is closer to the subscriber device than the additional subscriber device.

9. The method of claim 1, comprising:
in response to receiving the request to access the streaming service on the electronic device, determining, by the computing device, that an additional subscriber device is in the vicinity of the electronic device; and
determining that the subscriber device has been in the vicinity of the electronic device for more time than the additional subscriber device has been in the vicinity of the electronic device,
wherein providing data to access the streaming service is further based on determining that the subscriber device has been in the vicinity of the electronic device for more time than the additional subscriber device has been in the vicinity of the electronic device.

10. A system, comprising:
one or more processors; and
memory including a plurality of computer-executable components that are executable by the one or more processors to perform a plurality of actions, the plurality of actions comprising:
receiving, by a computing device, a request to access a streaming service on an electronic device;
in response to receiving the request to access the streaming service on the electronic device, determining, by the computing device, that a subscriber device is in a vicinity of the electronic device;
based on determining that the subscriber device is in the vicinity of the electronic device, determining, by the computing device, a user identifier associated with the subscriber device;
determining, by the computing device, that the user identifier is associated with a valid subscription to the streaming service; and
based on determining that the user identifier is associated with a valid subscription to the streaming service, providing, by the computing device, data to access the streaming service.

11. The system of claim 10, wherein determining that the subscriber device is in the vicinity of the electronic device, comprises:
determining that the subscriber device and the electronic device are connected to a same Wi-Fi network.

12. The system of claim 10, wherein determining that the subscriber device is in the vicinity of the electronic device, comprises:
determining that the subscriber device and the electronic device are communicating over short-range radio.

13. The system of claim 10, wherein the actions comprise:
determining that the user identifier is associated with a primary account holder of a wireless carrier of the subscriber device,
wherein providing data to access the streaming service comprises providing data to access a full catalog of content offered by the streaming service based on determining that the user identifier is associated with a primary account holder of a wireless carrier of the subscriber device.

14. The system of claim 10, wherein the actions comprise:
receiving, by the computing device, an additional request to access the streaming service on the electronic device;
in response to receiving the additional request to access the streaming service on the electronic device, determining, by the computing device, that the subscriber device is not in the vicinity of the electronic device and that an additional subscriber device is in the vicinity of the electronic device;
based on determining that the additional subscriber device is in the vicinity of the electronic device, determining, by the computing device, an additional user identifier associated with the additional subscriber device;
determining, by the computing device, that the additional user identifier is associated with a secondary account holder of the wireless carrier of the subscriber device; and
determining that the additional user identifier is associated with the secondary account holder of the wireless carrier of the subscriber device, providing, by the computing device and to the electronic device, data to access a limited catalog of content offered by the streaming service.

15. The system of claim 10, wherein the actions comprise:
determining that the user identifier is associated with a secondary account holder of a wireless carrier of the subscriber device,
wherein providing data to access the streaming service comprises providing data to access a limited catalog of content offered by the streaming service based on determining that the user identifier is associated with the secondary account holder of the wireless carrier of the subscriber device.

16. The system of claim 10, wherein the actions comprise:

receiving, by the computing device, an additional request to access an additional streaming service on the electronic device;

in response to receiving the additional request to access the additional streaming service on the electronic device, determining, by the computing device, that an additional subscriber device is in the vicinity of the electronic device;

based on determining that the additional subscriber device is in the vicinity of the electronic device, determining, by the computing device, an additional user identifier associated with the additional subscriber device;

determining, by the computing device, that the additional user identifier is not associated with a valid subscription to the additional streaming service; and based on determining that the additional user identifier is not associated with a valid subscription to the additional streaming service, providing, by the computing device and to the electronic device, data to access a limited catalog of content offered by the streaming service.

17. The system of claim 10, wherein the actions comprise:

in response to receiving the request to access the streaming service on the electronic device, determining, by the computing device, that an additional subscriber device is in the vicinity of the electronic device;

based on determining that the subscriber device is in the vicinity of the electronic device, determining, by the computing device, an additional user identifier associated with the additional subscriber device;

determining that the user identifier is associated with a primary account holder of a wireless carrier of the subscriber device;

determining that the additional user identifier is associated with a secondary account holder of the wireless carrier of the additional subscriber device; and based on determining that the user identifier is associated with the primary account holder and the additional user identifier is associated with a secondary account holder, determining, by the computing device, that the electronic device is closer to the subscriber device than the additional subscriber device, wherein providing data to access the streaming service is further based on determining that the electronic device is closer to the subscriber device than the additional subscriber device.

18. The system of claim 10, wherein the actions comprise:

in response to receiving the request to access the streaming service on the electronic device, determining, by the computing device, that an additional subscriber device is in the vicinity of the electronic device; and determining that the subscriber device has been in the vicinity of the electronic device for more time than the additional subscriber device has been in the vicinity of the electronic device, wherein providing data to access the streaming service is further based on determining that the subscriber device has been in the vicinity of the electronic device for more time than the additional subscriber device has been in the vicinity of the electronic device.

19. One or more non-transitory computer-readable media of a computing device storing computer-executable instructions that upon execution cause one or more processors to perform acts comprising:

receiving, by a computing device, a request to access a streaming service on an electronic device;

in response to receiving the request to access the streaming service on the electronic device, determining, by the computing device, that a subscriber device is in a vicinity of the electronic device;

based on determining that the subscriber device is in the vicinity of the electronic device, determining, by the computing device, a user identifier associated with the subscriber device;

determining, by the computing device, that the user identifier is associated with a valid subscription to the streaming service; and based on determining that the user identifier is associated with a valid subscription to the streaming service, providing, by the computing device, data to access the streaming service.

20. The media of claim 19, wherein the actions comprise:

determining that the user identifier is associated with a primary account holder of a wireless carrier of the subscriber device, wherein providing data to access the streaming service comprises providing data to access a full catalog of content offered by the streaming service based on determining that the user identifier is associated with a primary account holder of a wireless carrier of the subscriber device.

* * * * *